United States Patent [19]

Smith et al.

[11] Patent Number: 5,198,528

[45] Date of Patent: Mar. 30, 1993

[54] DIALLYL ETHER HIGH SOLIDS ALKYD

[75] Inventors: Arthur C. Smith; Jeffrey H. Danneman, both of Pensacola, Fla.

[73] Assignee: Reichold Chemicals, Inc., Durham, N.C.

[21] Appl. No.: 823,161

[22] Filed: Jan. 21, 1992

[51] Int. Cl.$^5$ .................... C08G 63/20; C08G 63/28; C08L 67/08

[52] U.S. Cl. .................... 528/272; 528/274; 528/295.5; 528/296; 528/302; 528/308; 524/377; 524/601; 525/437; 106/252

[58] Field of Search .................... 528/272, 274, 295.5, 528/296, 302, 308; 524/377, 601; 525/437

[56] References Cited

U.S. PATENT DOCUMENTS

| | | | |
|---|---|---|---|
| 3,355,502 | 11/1967 | Delins | 260/615 |
| 4,871,807 | 10/1989 | Staritzbichler et al. | 525/113 |
| 4,997,480 | 3/1991 | Rao | 106/251 |

FOREIGN PATENT DOCUMENTS 0234641 9/1987 European Pat. Off.
2190672 11/1987 United Kingdom.

OTHER PUBLICATIONS

O'Neil et al., Allyl Ethers in Solventless and Water-Based Coatings, J. of the Oil and Colour Chemists Association, vol. 48, No. 11, pp. 1025-1039 (Nov. 1965).

Jenkins et al., The Design of Unsaturated Polyester Resin for Surface Coatings pp. 42-59, Jan. 1961.

Air-Drying Oil-Free Polyester-Esters, Chatfield, Paint Technology, Apr. 1962, pp. 17-21.

Heat Convertible Polyether Ester Resins, Chatfield, Paint Technology, Dec. 1962, pp. 13-16.

Primary Examiner—Paul R. Michl
Assistant Examiner—Tae H. Yoon
Attorney, Agent, or Firm—Michael L. Dunn

[57] ABSTRACT

An alkyd resin comprising a polymerized product of from 25 to 40 percent by weight of trimethylolpropane diallyl ether, from 15 to 30 percent by weight of aromatic acid, from 20 to 40 percent by weight drying compound and from 7 to 16 percent by weight polyol.

The invention also includes solutions and dispersions of the resin of the invention and coatings made from the resin or solutions or dispersions thereof.

The resin is characterized by being compatible with solvents such as mineral spirits and having good drying properties and being able to form strong flexible films which are resistant to yellowing, and which have low water sensitivity.

Prior to the present invention, a non-yellowing alkyd resin having such a combination of properties was unavailable.

5 Claims, No Drawings

DIALLYL ETHER HIGH SOLIDS ALKYD

BACKGROUND OF THE INVENTION

Solvent based paints and coatings became popular over the years due to the ability to tailor physical properties depending upon resins and other components used. Among the desirable properties obtainable with solvent coatings are quick drying properties, good water resistance, good film coalescence, and resistance to yellowing.

Recently, it has become recognized that solvent emissions can contribute to atmospheric pollution. Low solvent loading is therefore important to reduce solvent emissions into the atmosphere.

Alkyd resins have been known and used for many years. Such resins have had many desirable properties and have had numerous utilities, especially in coating applications. Unfortunately, such resins have had a serious deficiency in that when they are sufficiently soluble for use in high solid systems, they tend to yellow or to have long drying times in air. In general, such resins have not been suitable for high solids coating formulations with reduced solvent loading while having good drying properties to form non-yellowing, water-resistant coatings having a combination of good hardness and flexibility.

Attempts have been made to overcome such problems, e.g., by incorporation of allyl ethers to reduce yellowing with or without fatty acids or drying oils such as described in numerous publications, e.g., Allyl Ethers in Solventless and Water-Based Coatings, O'-Neil et al., J. of the Oil and Colour Chemists Association, Vol. 48, No. 11, pp. 1025-1039, Nov. 1965; The Design of Unsaturated Polyester Resins for Surface Coatings, Jenkins et al., pp. 42-59, January 1961; Air-Drying Oil-Free Polyether-Esters, Chatfield, Paint Technology, April 1962, pp. 17-21; Heat Convertible Polyether Ester Resins, Chatfield, Paint Technology, December 1962, pp. 13-16; UK Patent Application 2,190,672, published Nov. 25, 1987; and European Patent Application 0,234,641, published Sep. 2, 1987; all of which are incorporated herein by reference as background information.

In addition, a number of U.S. Pat. Nos. have issued in the area, e.g., U.S. Pat Nos. 3,355,502; 4,871,807 and 4,997,480 all of which are incorporated herein by reference.

The use of trimethylolpropane diallyl ether, in the prior art, often resulted in poor compatibility with solvents or undesirable hardness, as did significant reduction or elimination of drying oils or drying fatty acid content.

The inclusion of aromatic acids into the polymer could similarly cause problems with increased hardness, while inclusion of significant quantities of polyol often resulted in water sensitivity or solvent incompatibility.

BRIEF DESCRIPTION OF THE INVENTION

An alkyd resin is provided which comprises a polymerized product of from 25 to 40 percent by weight of trimethylolpropane diallyl ether, from 15 to 30 percent by weight of aromatic acid, from 20 to 40 percent by weight drying compound and from 7 to 16 percent by weight polyol.

The invention also includes solutions and dispersions of the resin of the invention and coatings made from the resin or solutions or dispersions thereof.

The resin is characterized by being compatible with solvents such as mineral spirits and having good drying properties and being able to form strong flexible films which are resistant to yellowing, and which have low water sensitivity.

Prior to the present invention, a non-yellowing alkyd resin having such a combination of properties was unavailable.

DETAILED DESCRIPTION OF THE INVENTION

"Alkyd resin" as used herein means a reaction product of polyol and polycarboxylic acid in conjunction with a compound having crosslinking unsaturated bonds such as a drying oil or ethylenically unsaturated fatty acid.

"Polyol" as used herein means a polyhydric alcohol, or mixtures thereof, such as pentaerythritol, trimethylol propane, trimethylol ethane, propylene glycol, ethylene glycol, glycerine or a prepolymer having a plurality of functional hydroxyl groups.

"Polycarboxylic acid" as used herein means a compound, or mixtures thereof, having a plurality of functional carboxylic acid groups or their anhydrides such as aromatic polycarboxylic acids, and prepolymers having a plurality of functional carboxylic acid groups. Preferred polycarboxylic acids are aromatic acids such as phthalic acid, phthalic anhydride or trimellitic anhydride.

"Drying compound" as used herein means an oil or fatty acid, or mixtures thereof, which will crosslink upon exposure to air. Examples of such oils are linseed oil, safflower oil, tall oil, tung oil and soybean oil. Unsaturated fatty acids may be considered drying oils when they cure or harden upon exposure to air. Such fatty acids usually contain chains of from 12 to 22 carbon atoms. A commonly employed fatty acid is an unsaturated C-16 fatty acid.

"High solids" as used herein means less than 400 grams, and preferably less than 250 grams, per liter of volatile solvents are included in the composition.

"Volatile solvent" as used herein, means an organic solvent having a boiling point which is lower than 250° C.

The components of the alkyd resin may be combined by means known to those skilled in the art, e.g., by blending the components and reacting at from about 200° to 250° C.

The solutions and dispersions of the present invention are simply made by dissolving or dispersing the components using suitable mixing apparatus as known to those skilled in the art.

In accordance with the present invention, it has been unexpectedly found that alkyd resins may be manufactured which are suitable for high solids, low solvent coatings.

The inclusion of relatively high percentages of drying compound into polyester type resins reduce the requirement for solvents since the drying compounds themselves may be considered as cosolvents. Such drying compounds are not, however, very volatile and thus do not significantly increase air pollution relative to solvents having high volatility such as mineral spirits. Unfortunately, the inclusion of such drying compounds have resulted in films having one or more of poor yellowing characteristics, slow drying or soft films.

The present invention addresses the forgoing problems in that the resin of the invention contains drying compound which allows reduced volatile solvent loading while simultaneously permitting films to be formed which have good yellowing characteristics, optimized hardness and flexibility and acceptable drying properties.

The resin of the present invention, having these desired superior characteristics, is obtained by careful balance of the components to make the resin. In particular, as previously mentioned, the resin of the invention comprises from 25 to 40 weight percent trimethylolpropane diallyl ether, from 15 to 30 weight percent aromatic acid, from 20 to 40 weight percent drying compound and from 7 to 16 weight percent polyol.

It has been found that the inclusion of trimethylolpropane diallyl ether (TMPDAE) accomplishes two results. First the diallyl ether reduces yellowing caused by drying oil and secondly the diallyl ether increases the hardness which counterbalances softness caused by drying compound. It has been found that at least twenty five percent by weight TMPDAE should be included to obtain significant reduction of yellowing. Over 40 weight percent TMPDAE should be avoided since hardness and brittleness becomes too high for acceptable paint films and compatibility with solvents, such as mineral spirits, is unacceptably reduced.

In accordance with the present invention, at least 20 weight percent drying compound should be used to increase solvent compatibility and to reduce the need for solvents having high volatility. If over 35 weight percent drying compound is used, unacceptable yellowing and film softness may occur. The preferred drying compound is linoleic rich fatty acid.

Aromatic acids are included in the present invention to balance the hardness of the coating film. When less than 15 weight percent aromatic acid is used, the polymer is too soft and if greater than 30 weight percent aromatic acid is used, the polymer is too hard.

Polyol is included to react with the acid groups in other components to increase molecular weight. If less than 7 weight percent polyol is included, the molecular weight will be too low to give good drying properties. If over sixteen weight percent polyol is used, the polymer will be too water sensitive. Furthermore, a wide molecular weight distribution may result which can adversely affect drying properties.

Catalysts, such as dibutyl tin oxide, may optionally be included to improve drying properties. Such catalysts are frequently included at levels of from about 0.1 to about 0.2 weight percent.

The alkyd resin of the composition may be used to form a coating composition by dissolving the resin in a solvent, usually at a level of less than 400 grams per liter and preferably less than 250 grams per liter of solvent in the finished coating composition.

To form a coating, a film of the coating composition is applied to an article and allowed to cure, i.e., dry wherein the drying compound forms a crosslinked structure.

The following example serves to illustrate and not limit the present invention.

EXAMPLE

A number of high solids alkyd type resins were prepared and compared as set forth in the table. Resin A is a low solids control resin containing 70 percent non-volatiles as compared with the remaining resins in the table which have about 90 percent non-volatiles.

The components were mixed to uniformity using a rotating high sheer mixer.

Viscosity of the resin compositions was determined by comparison with Gardner Holt viscosity tubes.

The solvent used in the resins was mineral spirits.

Unless otherwise noted, all films were applied at 3.0 wet mils using a doctor blade. The substrate used was a Form 2A lacquered opacity chart from the Leneta Company. Color measurements were taken over the white section of these charts with a Gardner XL 20 colorimeter using the Hunter L, a, and b color scale. For each color determination an L (light-dark) value and a b (yellow-blue) value were obtained using a white color standard as a backer for the test panel. These color readings were converted to a yellowness index (Y.I.) according to ASTM E-313 where $Y.I. = 142.9\ b/L$. This mathematical treatment provides a convenient single number for comparing color change. As a film yellows, the L value decreases (darker) and the b value increases (yellower) to give a higher Y.I. value. Data is calculated as Delta Y.I. which is Final Y.I. Initial Y.I. Initial Y.I. values were recorded after 7 days of dry time.

Dark storage, denoted by Y.I.D, indicates storage in a bench drawer, face up. Darkness yellowing data is presented as a % difference versus a conventional solids control resin.

% difference =

$$\left( \frac{DELTA\ YID_{experimental} - DELTA\ YID_{control}}{DELTA\ YID_{control}} \right) 100$$

Accelerated test methods were also used to evaluate yellowing tendency. A first accelerated test method was to allow panels to air dry seven days and then to expose them to 120° F for five days in a Blue M model 206c forced draft oven with the vents open. Final Y.I. values were recorded within five minutes of removing the panels from the oven. Color values for these parts are denoted by Y.I.H.

A second accelerated test was to expose panels to ammonia fumes. For this test the parts were coated on the reverse side of a Leneta Form 2A to prevent absorption of the ammonia by the paper. After seven days of drying, the coated section of the charts was cut out and eight panels were taped in a lined five-gallon pail. Five drops of 28% ammonia were placed in a small watch glass in the bottom of the pail and the lid was closed. Panels were removed after six hours and the color was determined within five minutes. Color values for this test are designated by Y.I.N.

Results and compositions are as shown in the table.

Resin A contains 30 percent volatile solvent and is used as a control

Resin B is a high solids composition free from trimethylol propane diallyl ether (TMPDAE) which is required to be present in accordance with the present invention. Resin B yellows significantly.

Resins C and D are high solids compositions which contain TMPDAE, but at a concentration lower than required by the present invention. Resins C and D yellow significantly.

Resins E, F and H are resins in accordance with the present invention. The films are characterized by low yellowing and by being strong and flexible.

Resin G is a resin which contains no drying compound. The resin is too brittle for use in coating applications.

Resin I is a commercially available high solids alkyd resin which does not meet the TMPDAE composition requirements of the present invention. The resin is strong and flexible, but yellows significantly.

TABLE I

RESIN COMPOSITION AND YELLOWING RESULTS, GLOSS ENAMEL

| Resin | NV | Viscosity | PAINT VOC | % PA | % TMA | % Oil |
|---|---|---|---|---|---|---|
| Resin A | 70 | Z1-Z4 | 420 | 24.5 | — | 62 |
| Resin B | 90 | Z1-Z3 | 250 | 9.0 | 7 | 57.9 |
| Resin C | 90 | Z2-Z3 | 250 | 7.2 | 10.6 | 43 |
| Resin D | 90 | Z1-Z2 | 250 | 8.0 | 9.6 | 44.4 |
| Resin E | 90 | Z1-Z2 | 250 | 27.0 | — | 30.5 |
| Resin F | 90 | X-Y | 250 | 27.8 | — | 30.1 |
| Resin G | 90 | X-Y | 250 | — | 25.4 | — |
| Resin H | 90 | Y-Z2 | 250 | 20 | 4.5 | 38.8 |
| Resin I | 90 | | 250 | | | |

| Resin | Type | % Oil | Type | TMPDAE |
|---|---|---|---|---|
| Resin A | Soya | .8 | TOFA | — |
| Resin B | Soya | 3.2 | PAM 300 | — |
| Resin B | | 13.2 | TOFA | |
| Resin C | SOYA | 12.5 | TOFA | 20 |
| Resin D | SUN | 13 | PAM 300 | 20.4 |
| Resin E | PAM 300 | | | 36.1 |
| Resin F | SUN | | | 36.1 |
| Resin G | — | | | 79.2 |
| Resin H | SUN | .2 | PAM 300 | 32.3 |
| Resin I | | | | |

| Resin | FLEXIBILITY | DELTA YIN | DELTA YIH | 12 MONTH DARK % Diff. |
|---|---|---|---|---|
| Resin A | STRONG/ FLEXIBLE | 7.82 | 1.67 | 0.00 |
| Resin B | | 10.20 | 2.12 | +47.9 |
| Resin C | STRONG/ FLEXIBLE | 7.48 | 1.21 | +76.1 |
| Resin D | | 7.63 | 1.97 | +71.5 |
| Resin E | STRONG/ FLEXIBLE | 3.66 | 1.06 | −25.0 |
| Resin F | STRONG/ FLEXIBLE | 4.27 | 0.6 | −27.12 |
| Resin G | BRITTLE | 1.06 | 0.10 | −70.56 |
| Resin H | STRONG/ FLEXIBLE | 4.55 | 1.28 | — |
| Resin I | | 10.86 | 2.74 | +41.52 |

PA = phthalic anhydride
TMA = trimellitec anhydride
VOC = grams per liter of volatile solvent
TOFA = tall oil fatty acid
PAM 300 = pamolyn 300 fatty acids from Hecules (mixture of linoleic and oleic)
SOYA = soya oil
SUN = sunflower oil TABLE I (cont.) TABLE I (cont.)

What is claimed is:

1. An alkyd resin comprising a polymerized product of:
   a) from 25 to 40 percent by weight of trimethylolpropane diallyl ether.
   b) from 15 to 30 percent by weight of aromatic acid.
   c) from 20 to 40 percent by weight drying compound; and
   d) from 7 to 16 percent by weight polyol.

2. A coating composition comprising the compound of Claim 1 in combination with from zero to 400 grams per liter of composition, of a volatile solvent.

3. A coating comprising a cured film of the composition of claim 2.

4. A method of coating an article comprising applying a film of the composition of claim 2 to said article and allowing said film to cure.

5. The composition of claim 2 wherein from about 0.1 to about 0.2 weight percent of a drying catalyst is present in the composition.

* * * * *